United States Patent [19]
Weiss

[11] Patent Number: 5,343,676
[45] Date of Patent: Sep. 6, 1994

[54] DEVICE FOR RECOGNIZING FERROMAGNETIC FOREIGN BODIES, IN PARTICULAR IN RESPECT OF HARVESTING MACHINES

[75] Inventor: Burkhard Weiss, Weigsdorf-Koeblitz, Fed. Rep. of Germany

[73] Assignee: Claas Saulgau GmbH, Saulgau, Fed. Rep. of Germany

[21] Appl. No.: 989,841

[22] Filed: Dec. 10, 1992

[30] Foreign Application Priority Data

Dec. 11, 1991 [DE] Fed. Rep. of Germany ....... 4140812

[51] Int. Cl.$^5$ .......................................... A01D 75/18
[52] U.S. Cl. ..................................... 56/10.2 J; 460/2
[58] Field of Search .................... 56/1, 10.2, DIG. 15; 460/2, 105, 106

[56] References Cited

U.S. PATENT DOCUMENTS

| 3,972,156 | 7/1976 | Bennett, Jr. et al. | 460/3 |
| 4,290,255 | 9/1981 | Martenas | 460/2 |
| 4,433,528 | 2/1984 | Bohman | 460/2 X |
| 4,758,788 | 7/1983 | Weiss et al. | 56/10.2 X |
| 5,078,645 | 1/1992 | Bohman et al. | 460/2 |
| 5,092,818 | 3/1992 | Bohman et al. | 460/2 |

FOREIGN PATENT DOCUMENTS

| 0229991 | 10/1990 | European Pat. Off. |
| 2252595 | 5/1973 | Fed. Rep. of Germany . |
| 2430147 | 1/1975 | Fed. Rep. of Germany . |
| 3211819 | 11/1982 | Fed. Rep. of Germany . |
| 3341071 | 5/1984 | Fed. Rep. of Germany . |
| 3511355 | 10/1985 | Fed. Rep. of Germany . |
| 255432 | 4/1988 | Fed. Rep. of Germany . |
| 260774 | 10/1988 | Fed. Rep. of Germany . |
| 4017780 | 12/1991 | Fed. Rep. of Germany . |

OTHER PUBLICATIONS

Agrartechnik International—Apr. 1983; W. Gauggel: "Wie funktioniert der Metalldetektor?".

Primary Examiner—Terry Lee Melius
Attorney, Agent, or Firm—Spencer, Frank & Schneider

[57] ABSTRACT

In a device for recognizing ferromagnetic foreign bodies, for protecting the working members of a harvesting machine, having a magnetic field generating device (9), the lines of flux of which run transversely to the direction of transport, and having assigned pick-up coils (15; 16; 17), it is intended to improve the recognition range across the entire width of the feed system, whilst keeping costs low. At the same time, it is intended better to suppress disturbance signals. For this purpose, the magnetic field generating device (9) comprises an odd number of magnetic poles (12; 13; 14), the two outer magnetic poles (13; 14) possessing the same polarity. At least every second magnetic pole (12) is enclosed by a pick-up coil (15). Expediently, three magnetic poles (12; 13; 14) are present, which are all enclosed by a pick-up coil (15; 16; 17) each. The pick-up coils (15; 16; 17) are connected up such that the induced voltages are added together.

2 Claims, 2 Drawing Sheets

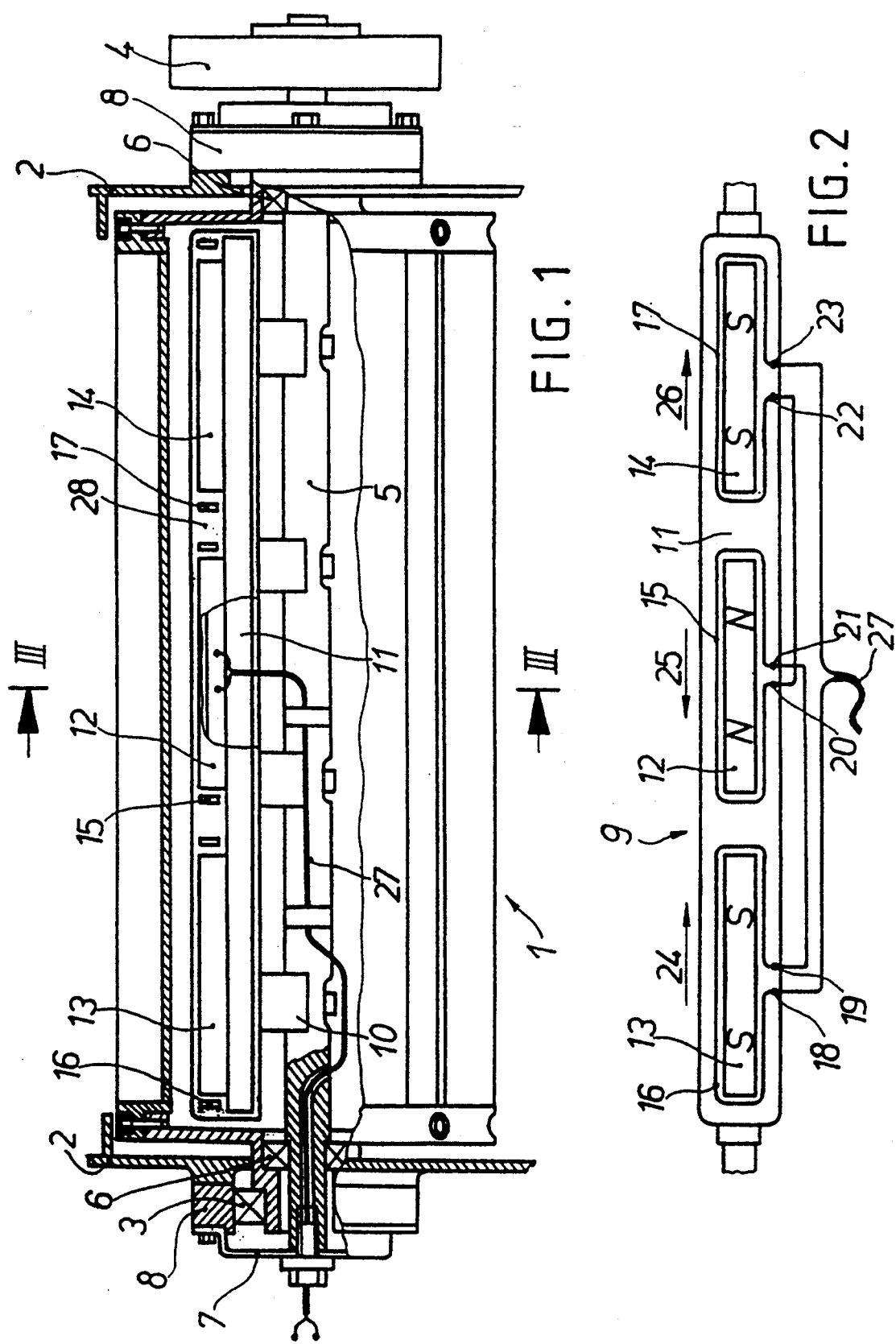

Fig. 3
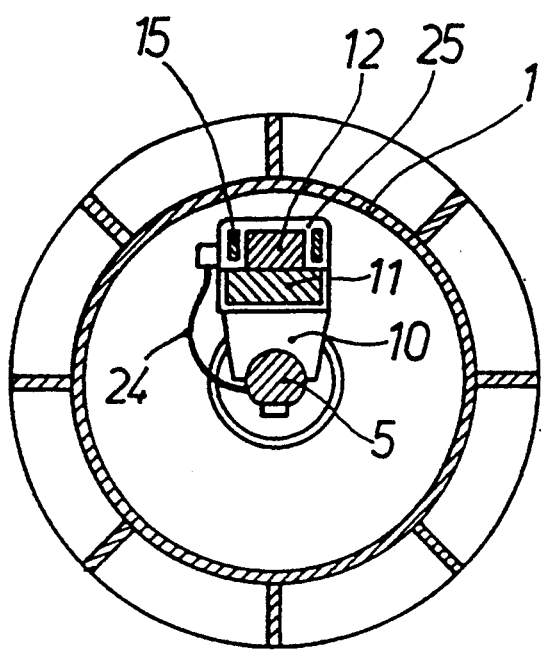
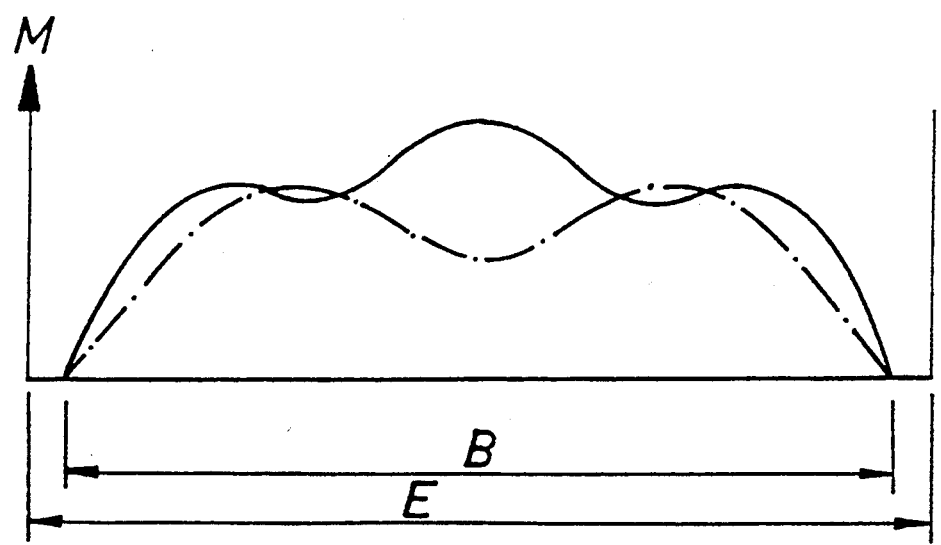
Fig. 4

DEVICE FOR RECOGNIZING FERROMAGNETIC FOREIGN BODIES, IN PARTICULAR IN RESPECT OF HARVESTING MACHINES

BACKGROUND OF THE INVENTION

1. Field of the Invention

The invention relates to a device for recognizing ferromagnetic foreign bodies, in particular for protecting the working members of a harvesting machine, e.g. a field chopper.

2. Background Information

A plurality of similar electrical devices for this purpose are known, in particular from DE 22 52 595 A1, DE 24 30 147 A1 and from the magazine "Agrartechnick International", Apr. 1983, page 17. These devices have the common feature that the lines of flux extend in the direction of transport. At least two magnetic poles are seated one behind the other in this direction. This produces a wide construction which leads to difficulties when fitted into a roller and which limits the range of the magnetic fields.

A device of the same generic type is known from EP 02 29 991 B1. For the generation of the magnetic fields, block-shaped permanent magnets are lined up on a flat rail, disposed in the interior of a transport roller and displaying good magnetic conductivity, which permanent magnets are magnetized perpendicularly to the rail and approximately radially in relation to the roller axis. The magnets on half the rail length, i.e. on half the transport path width, form north poles and the magnets on the other half form south poles. The magnetic lines of flux thus extend transversely to the direction of transport. The central magnets, respectively, of the two magnet assemblies are surrounded in each case by a pick-up coil, which pick-up coils—the direction of winding being the same—are connected up in opposition to one another.

An adverse effect in this case is that where electrical conductors are moved closely over the magnet, e.g. in the case of the metallic roller shell, the sensitivity of the device can be substantially curtailed because the eddy currents produced in the electrical conductors then induce disturbance voltages in the pick-up coil. The sensitivity of the device is also negatively influenced by the opposite magnetic polarity at the sides of the transport path. This gives rise to a closure of the magnetic field over the magnetic frame of the harvesting machine, so that moving parts of the frame or their natural vibrations cause disturbance voltages. Finally, the size of the spatial area above the device, within which vagrant ferromagnetic parts are recognized, also does not yet meet the requirements in respect of large harvesting machines. In particular, the height of this "recognition area" is limited due to the large distance between the magnetic poles.

SUMMARY OF THE INVENTION

By using the invention, it is intended to overcome these disadvantages. The object of the invention is to provide a device for recognizing ferromagnetic foreign bodies, which device very largely precludes the induction of disturbance voltages in the pick-up coils and guarantees a large recognition height even where there are large transport path widths, whilst at the same time keeping production costs low.

This object is achieved according to the invention by the fact that the magnetic field generating device comprises an odd number of magnetic poles, the two outer magnetic poles possessing the same polarity, and that at least every second magnetic pole is enclosed by a pick-up coil. The magnetic poles are disposed in a line transversely to the transport path of the harvested crop. The pick-up coils are connected up in known manner one behind the other, such that the voltages which are induced in them are added together.

If the magnetic field is approached by a ferromagnetic foreign body, then its lines of flux are displaced or cut, voltages thereby being induced in the pick-up coils so that a current flows. As a result of the polarity of the outer magnetic poles being the same, the surrounding magnetizable frame of the harvesting machine is prevented from being incorporated into the magnetic field of the device. The disturbance voltages which are caused by movable components on the frame are thereby precluded, so that greater sensitivity is achieved in relation to the previously known devices. As a result of this magnetic pole arrangement, a compensation effect is additionally achieved in relation to the eddy current effect in electrical conductors moved closely over the magnet, thereby leading to a further fall in disturbance signals. It thus becomes possible, without any sensitivity restriction, to make the roller enclosing the device out of non-magnetizable steel. In relation to the plastic rollers which are necessary according to the prior art, this offers advantages in terms of reliability and functioning. As a result of the arrangement of pick-up coils around every second or even around every magnetic pole, a strong, easily analyzable recognition signal can be generated by means of the cumulative connection of the pick-up coils.

Apart from the previously mentioned preclusion of disturbance signals, it is advantageous in the case of the solution according to the invention that the construction of the magnetic field generating device is simple and that, particularly in the case of large transport path widths, an almost constant recognition signal is generated across the entire width.

For the satisfactory functioning of the device, it is a precondition however, as is also the case in all previously known solutions, that all movable machine parts located in the recognition area, such as, in particular, transport rollers, consist of non-magnetic materials.

In order to achieve a sufficiently high likelihood of recognition, it is expedient for the magnetic field generating device to comprise three magnetic poles, the two magnetic poles of the same polarity being disposed directly on the outer sides of the transport path and the third, opposite-poled magnetic pole being disposed dead centrally to the harvested crop transport path. Preferably, free spaces are provided between the magnetic poles and all magnetic poles are enclosed by pick-up coils, which are connected in series-cumulative connection.

It is further possible to break down the individual magnetic poles into a plurality of individual units, which are disposed in mirror image to one another on the baseplate. In this case, at least one of the individual units of each magnetic pole is enclosed by a pick-up coil.

BRIEF DESCRIPTION OF THE DRAWINGS

The invention is to be explained in greater detail below with reference to an illustrative embodiment. In the associated drawings, FIG. 1 shows a part-section through the lower transport roller of a field chopper having an in-built device for protection from metallic foreign bodies, FIG. 2 shows a diagrammatic top view onto the magnetic field generating device displaying the position and connection of the pick-up coils, FIG. 3 shows a cross section III—III of the transport roller according to FIG. 1 and FIG. 4 shows a diagram of the distribution and range of the recognition facility M across the width B of the magnetic field generating device or the width E of the harvested crop transport path.

DETAILED DESCRIPTION OF THE PREFERRED EMBODIMENTS

According to FIGS. 1 and 3, a recognition device is installed in the front, lower roller 1 of a feed system (not represented) of a field chopper. Between the side walls 2 of the feed system, the roller 1, consisting of non-magnetizable steel, is received in a rotationally movable manner by mountings 3. On one side, the roller 1 is driven by means of a gear system 4. An axle 5 is mounted coaxially in the roller by means of mountings 6. The axle 5 protrudes by one end out of the mounting 3 of the roller 1 and is rigidly connected by means of a holding fixture 7 to the bearing housing 8 and the side wall 2.

On the axle 5, there is disposed this magnetic field generating device 9 shown in FIG. 2. For this purpose, a baseplate 11 is detachably fastened by means of intermediate pieces 10 to the axle 5, the baseplate 11 consisting of a material displaying good magnetic conductivities. On the baseplate 11, magnetic poles 12; 13; 14 are fastened such that, dead centrally to the harvested crop transport path or to the roller 1, there is disposed a pole 12 (in the illustrative embodiment, the north pole), and symmetrically to the pole 12, as near as possible to the side walls 2, there are disposed two further poles 13 and 14 of opposite polarity (i.e. in the illustrative embodiment, south poles).

Around each magnetic pole 12; 13; 14 there is placed a pick-up coil 15; 16; 17 in a plurality of windings. The connecting terminals 19; 20; 21; 22 are connected up to one another such that the induced voltages are added together. The current direction is indicated by arrows 24; 25; 26. A cable 27 is connected to the connecting terminals 18; 23, which cable leads through the axle 5 outwards to a signal processing device (not represented). Ultimately, all the components of the magnetic field generating device 9 and the pick-up coils 15; 16; 17 are enclosed, for position-fixing and protection purposes, by a plastic casing 28.

If the recognition device is approached by a ferromagnetic foreign body, a current is induced in the pick-up coils 15; 16; 17, the size of which current is dependent upon the distance of the metallic foreign body from the pick-up coils 15; 16; 17. In the signal processing device, the derived signal is electrically converted in known manner in order automatically to immobilize the feed system of the field chopper.

In FIG. 4, the recognition profile, i.e. the recognition facility M across the width B of the magnetic field generating device 9 and the width E of the harvested crop transport path, is represented. The dashdot line represents in this case the characteristic line of the known solution according to EP 02 29 991 B1. The unbroken solid line is the characteristic line according to this illustrative embodiment of the invention.

It is evident from this that, apart from the other advantages, an improvement in the recognition facilities in the marginal areas and in the central area has been achieved.

In order to make the variation of the characteristic line more uniform, it is possible to increase the number of magnetic poles to five or more.

1 roller
2 side wall
3 mounting
4 gear system
5 axle
6 mounting
7 holding fixture
8 bearing housing
9 magnetic field generating device
10 intermediate piece
11 baseplate
12 magnetic pole
13 magnetic pole
14 magnetic pole
15 pick-up coil
16 pick-up coil
17 pick-up coil
18 connecting terminal
19 connecting terminal
20 connecting terminal
21 connecting terminal
22 connecting terminal
23 connecting terminal
24 current direction
25 current direction
26 current direction
27 cable
28 plastic casing

I claim:

1. A device for recognizing ferromagnetic foreign bodies, in particular for protecting the working members of a harvesting machine, comprising:

a magnetic field generating device having a plurality of magnetic poles for generating magnetic fields, the magnetic poles extending in a line transversely to a transport path of the harvesting machine, the magnetic fields extending across the entire width of the transport path of the harvesting machine, lines of flux thereof running transversely to a direction of transport of a harvested crop on the transport path, and having pick-up coils connected in series such that voltages induced therein are added together, and a signal analyzing device connected down-stream from the pick-up coils, wherein the magnetic field generating device comprises an odd number of magnetic poles, two outer magnetic poles thereof possessing the same polarity, and wherein at least every second magnetic pole is enclosed by a respective pick-up coil.

2. The device as claimed in claim 1, wherein the odd number of magnetic poles of the magnetic field generating device comprises three magnetic poles, magnetic poles of the same polarity being disposed on outer sides of the transport path and a third, opposite-poled magnetic pole being disposed centrally to the transport path, and wherein the magnetic poles are each enclosed by a respective pick-up coil.

* * * * *

UNITED STATES PATENT AND TRADEMARK OFFICE
CERTIFICATE OF CORRECTION

PATENT NO. : 5,343,676
DATED : September 6, 1994
INVENTOR(S) : Burkhard Weiss

It is certified that error appears in the above-indentified patent and that said Letters Patent is hereby corrected as shown below:

```
On the title page, item [21], the Appln. No. should read
--988,841--.
```

Signed and Sealed this

Fifteenth Day of November, 1994

Attest:

BRUCE LEHMAN

Attesting Officer

Commissioner of Patents and Trademarks